Figure 1:
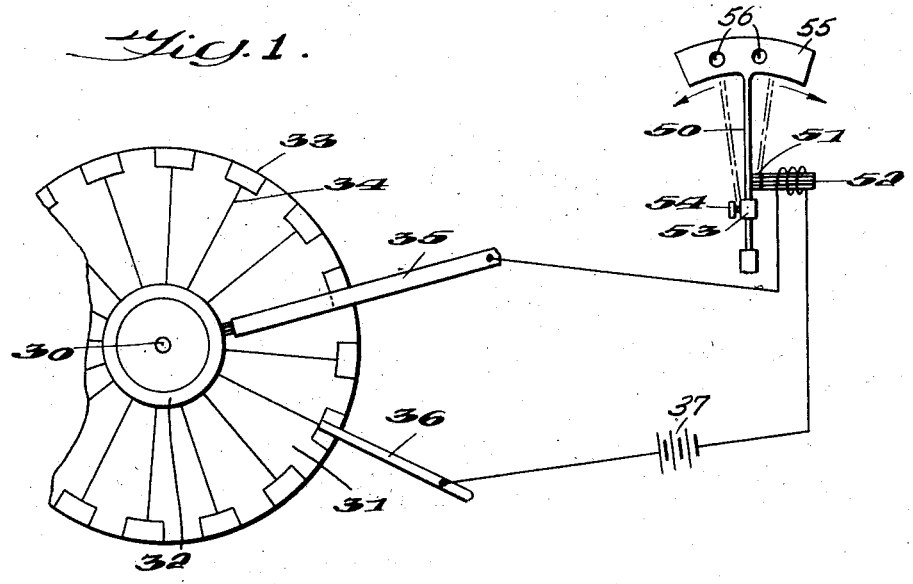

May 15, 1951     A. F. DE LIMA CAMPOS     2,553,171
APPARATUS FOR VIEWING STEREOSCOPIC MOTION PICTURES

Filed Oct. 14, 1947

Inventor
ALUIZIO FRAGOSO de LIMA CAMPOS,

By J. Allen Jones
Attorney

Patented May 15, 1951

2,553,171

UNITED STATES PATENT OFFICE 2,553,171

APPARATUS FOR VIEWING STEREOSCOPIC MOTION PICTURES

Aluizio Fragoso de Lima Campos, Rio De Janeiro, Brazil

Application October 14, 1947, Serial No. 779,671

1 Claim. (Cl. 88—16.6)

This invention relates to stereoscopic motion picture photography, that is, to motion picture photography which gives the viewing audience an illusion of depth.

Briefly, the invention relates to the viewing of successive photographs which have been taken on a single moving picture film through two laterally spaced lenses, successive frames of the moving picture film being taken alternately through the lenses so that every other frame will be taken, for example, through the left hand lens while the other frames are taken through the right hand lens.

In presenting to the audience the film exposed in the manner described above, each member of the audience is provided with a device which is movable in front of his eyes so that he is able to observe the projected moving picture with only one eye at a time. The device for blocking the observer's vision operates in synchronization with the movement of the film in the movie projector in such manner that the two eyes of the observer are covered alternately, with the right eye viewing only the frames taken through the right hand lens of the camera and the left eye viewing only the frames taken with the left lens of the taking camera. Because of the phenomena of "persistence of vision" and "fusion," the observer receives the impression of depth in the projected photographs. The right eye could view only the pictures taken through the left lens and vice versa, provided each eye sees only the pictures taken through one of the two lenses.

An object of the invention is to provide a viewing device for three dimensional motion pictures of the type having left and right hand views alternating on successive frames of the film, wherein the viewing device is readily adjustable for perfect synchronization with the film.

Another object of the invention is to provide apparatus for viewing stereoscopic motion pictures in which representations of views of an object from two laterally spaced positions appear alternately on successive frames, said apparatus comprising a vision masking member positioned in front of the eyes of each spectator, viewing openings in said member spaced apart laterally a distance differing from the normal human interocular distance, a resilient arm supporting said member, a weight slidable along said resilient arm to control the period of vibration of the arm, an electromagnet positioned to set up vibratory movement of said arm and said member, and means timed with the movement of the film for energizing and deenergizing said electromagnet to cause said vibratory movement of said member which thereby permits each eye of the spectator to view only the frames of the film representing the view from the corresponding position.

Figure 2:
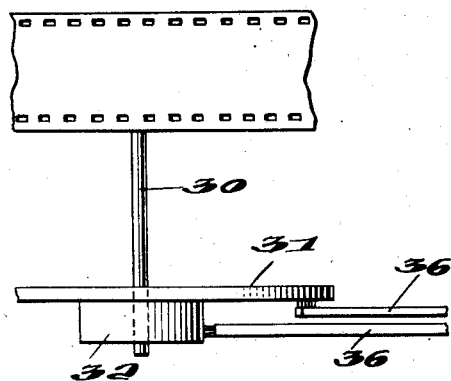

These and other objects of the invention will be apparent from the following description and the accompanying drawing, in which:

Fig. 1 is a diagrammatic view showing the manner in which the covering of the eyes of the observer is accomplished in synchronization with the movement of the film in the projector; and Fig. 2 is a plan view of the timing disc shown in Fig. 1, and showing diagrammatically the connection of the timing disc to the film feed.

Referring now to the drawing, after film is taken with alternating left and right hand images appearing on successive frames and the film has been developed, it is projected through a movie projector for viewing by spectators. For projection of the film, it is only necessary to modify a conventional moving picture projector by connecting to the film feed of the projector, as by a shaft 30, a circuit making and breaking arrangement as shown. This arrangement comprises a disc 31 of insulating material carrying a conducting collar 32, both of which rotate with shaft 30. The periphery of the disc 31 is provided with a plurality of equally spaced conducting portions 33, each of which is connected with collar 32 by a conductor 34.

In the viewing device, a resilient member 50 carries a quantity of iron 51 which is attracted by electro magnet 52 when this magnet is energized. A sliding weight 53 having a set screw 54 is movable along resilient member 50 similar to the manner in which the timing of a metronome is varied. Member 50 is anchored at its lower end and at its upper end carries any suitable device such as arcuate element 55 having openings 56 therein, spaced apart a distance less than the distance between a person's eyes. Member 50 is mounted in a suitable manner in front of the eyes of the spectator as by means of a support carried around the neck of the spectator, and of course each spectator must have such a device in order to obtain the three dimensional effect of the moving picture.

The conducting portions 33 on disc 31 are so dimensioned and spaced, and the movement of disc 31 is so coordinated with the movement of the film that brush 36 is in contact with one of the conducting portions 33 every time a film frame exposed through one of the two taking lenses is projected, while the brush 36 is in contact with an insulating portion of disc 31 every time a frame exposed through the other of the two taking lenses is projected. In this manner electro magnet 52 moves member 50 to cause the view of the left eye of the observer to be obscured or blocked off every time a frame exposed through the right hand lens of the camera is projected, and permits only the left eye to view frames exposed through the left lens of the camera. Thus, assuming that the film was exposed at the rate of 28 frames per second, disc 31 rotates so that a total of twenty-eight of its peripheral conducting and insulating portions sweep over brush 36 in each second.

By selecting the correct position of sliding weight 53 the exact synchronization of the oscillation of resilient element 50 with the film movement is achieved.

Due to the fact that each eye of the spectator sees only every other frame of the film, it is important that the film be run through the projector fast enough to eliminate any "flickering." For this purpose, it is generally desirable to operate the projector approximately twice as fast as would be the case with ordinary moving picture film, that is, twice as many frames must be shown per second.

I wish it to be understood that I am fully cognizant of the fact that numerous mechanical and electrical arrangements other than those I have disclosed can be used successfully in practicing my invention without departing from the basic inventive concept. It is my intention to cover by my patent all forms and manners of practicing the invention which fall within the scope of the appended claim.

I claim:

Apparatus for viewing stereoscopic motion pictures in which representations of views of an object from two laterally spaced positions appear alternately on successive frames, said apparatus comprising a vision masking member positioned in front of the eyes of each spectator, viewing openings in said member spaced apart laterally a distance differing from the normal human interocular distance, a resilient arm supporting said member, a weight slidable along said resilient arm to control the period of vibration of the arm, an electromagnet positioned to set up vibratory movement of said arm and said member, and means timed with the movement of the film for energizing and deenergizing said electromagnet to cause said vibratory movement of said member which thereby permits each eye of the spectator to view only the frames of the film representing the view from the corresponding position.

ALUIZIO FRAGOSO de LIMA CAMPOS.

REFERENCES CITED

The following references are of record in the file of this patent:

UNITED STATES PATENTS

| Number | Name | Date |
|---|---|---|
| 660,006 | Doyen | Oct. 16, 1900 |
| 830,217 | Fredell | Sept. 4, 1906 |
| 1,189,308 | Sullivan | July 4, 1916 |
| 1,259,775 | Prucha et al. | Mar. 19, 1918 |
| 1,596,835 | Hewson | Aug. 17, 1926 |
| 2,273,512 | Caldwell et al. | Feb. 17, 1942 |
| 2,365,212 | Oriol | Dec. 19, 1944 |

FOREIGN PATENTS

| Number | Country | Date |
|---|---|---|
| 152,367 | Great Britain | Oct. 21, 1920 |
| 91,584 | Switzerland | Nov. 1, 1921 |
| 178,344 | Great Britain | Apr. 20, 1922 |
| 559,378 | France | June 14, 1923 |
| 562,217 | France | Aug. 29, 1923 |
| 466,047 | Great Britain | May 21, 1937 |